STANNOUS FLUORO COMPLEX SALTS

William F. Bruce, Havertown, Pa., assignor, by mesne assignments, to American Home Products Corporation, New York, N. Y., a corporation of Delaware No Drawing. Application July 3, 1952, Serial No. 297,184

5 Claims. (Cl. 23—50)

This invention relates to a new composition of matter, namely, complex stannous fluoro salts and to a method for preparing the same.

More particularly, it relates to a complex salt structure containing a stannous ion, fluoride ions, a second halide ion, ammonium ions or ammonium ions in which one or more of the hydrogens has been replaced by an organic radical, and water of crystallization.

It has been found that when solutions of a soluble stannous salt such as stannous chloride or bromide are mixed with a solution of ammonium fluoride or the amine salt of hydrofluoric acid, there is formed a white crystalline precipitate. This material has been found to be a complex salt containing the ions indicated above.

The products of the invention have been found useful in several ways. For example, cellulosic materials, such as paper, are rendered fireproof by impregnation with a saturated solution of the products. The process has also been found to be useful in separating tin from some of its common impurities such as lead when they are in solution together in the form of their soluble salts. As still another example of utility, the compound of the invention, being somewhat soluble, is deemed useful in the form of a water solution for topical application to the teeth for increasing their hardness index and making them resistant to decay. And furthermore, in the normally alkaline environment of the mouth, such salts will slowly liberate ammonia or alkaline amines that will control acid forming decay bacteria.

The novel complex compounds of the invention have advantages over the individual compounds stannous fluoride and ammonium or amine fluorides since unlike stannous fluoride which is unstable and spontaneously decomposes in the presence of air and moisture to form $SnOF_2$, or the ammonium or amine fluorides which attack glass and therefore must be kept in wax bottles and are dangerous to handle, the compounds of the invention are stable under dry storage conditions for long periods of time and can be kept in ordinary glass containers.

In order to prepare the novel compounds, it is desirable to first prepare oxygen-free water for the reaction. This has been found advantageous in view of the fact that the starting stannous salts used are easily oxidized by dissolved oxygen to stannic salts which form contaminating insoluble compounds in the reaction. Since the contamination will be slight in any case, this need not be done if minor amounts of impurities are not objected to. In the preferred process of the invention, however, the water for the solutions is made oxygen-free by boiling or any other suitable process and the reactants are protected from air at all times by any suitable means, such as keeping them under any inert or reducing gas (e. g. nitrogen, hydrogen, etc.).

With this oxygen-free water relatively concentrated solutions of ammonium or amine fluorides and stannous chloride are then prepared. Any suitable forms of these salts may be used; however, the cheapest and most soluble forms are the hydrates of ammonium fluoride and stannous chloride. The desired amine hydrofluoride may be prepared by neutralizing a solution of hydrofluoric acid with the selected amine.

The operable concentrations of these solutions are limited only by the need for exceeding the solubility product of the desired compound in the final mixture in order for the product to crystallize out of solution. The product is soluble in water up to about 15–20% by weight at room temperature and when working at such temperature it is preferred to prepare solutions of the ammonium or amine fluoride of about 10–50% by weight and of stannous halide of about 10–50% by weight.

The stannous halide and ammonium or amine fluoride solutions are then mixed in a general ratio of about one mole of stannous halide to two moles of ammonium or amine fluoride. The mixing may be carried out in any suitable manner and in open or closed containers. As indicated before, it is preferred to operate with a closed container under nitrogen atmosphere until the final product is formed in order to prevent any oxidation of the stannous to stannic salts. No rigid limitations of temperature of reaction exist. However, it is preferred to have the reaction take place at room temperature because of the tendency of stannous compounds to hydrolyze and form insoluble precipitates.

The solution is then cooled to about 5° C. and the precipitate filtered off by any suitable means and washed with small amounts of cold water and dried.

Similar stannous fluoro complexes are formed when amine hydrofluoride salts are reacted with soluble stannous salts. As indicated before, the desired amine hydrofluoride salt may be prepared by neutralizing a solution of hydrofluoric acid with the particular amine. The instant invention contemplates the fluoride salts of both primary and secondary amines in which the amine may be one selected from the aliphatic or the aromatic series, excluding weakly basic amines or amines having acidic substituents. The substituted amines containing acidic groups would probably not react. By the acidic substituted amines are meant the amines containing such substituents as carboxyl, nitro or sulfonic acid groups on the alkyl chain, or hydroxy, carboxy, or sulfonyl groups on the aromatic ring. Specifically, any of the lower alkyls such as ethyl amine, propyl amine, or heptyl amine can be used. The non-acidic substituted lower alkyls can be used also, as for example, such substituents as the halogens, lower alkyls, cyano, thiocyano, alkoxy, hydroxy, etc., as found in compounds such as γ-chloropropyl amine, isopropyl amine, β-methyl-ethyl amine, and γ-hydroxy-propyl amine.

The same criteria exist for the selection of the aromatic amine as for the alkyl members of the series, namely that those substituted amines selected for use must have non-acidic substituents. Here again, the acid substituent on the ring would include such groups as the carboxyl, the sulfonyl and the hydroxy groups. Such non-acid substituents as nitro, halogen, alkyl, alkoxy, cyano, thiocyano, etc. in no way interfere with the formation of the amine hydrofluoride or in the formation of the complex with the stannous salt. For example, the hydrofluoride of benzylamine, aniline and the ring substituted modifications thereof can be prepared and reacted with soluble stannous salts to form such stannous fluoro complex salts.

In the preferred embodiment of my invention, the fluoride salt reactant is ammonium fluoride and the stannous salt is stannous chloride and the product obtained has the empirical formula $$Sn(NH_4)_2F_3Cl \cdot H_2O$$

It should also be evident that any sufficiently soluble and preferably non-toxic stannous salt can be used instead of the common stannous chloride, as for example the bromide. In such case, the bromide ion would be substituted for the chloride in the final product.

The following examples are illustrative of my invention but are not intended to limit said invention to the particular embodiments disclosed.

*Example 1*

To a filtered solution of 11 g. of ammonium fluoride in 25 cc. of oxygen-free distilled water in a one liter Erlenmeyer flask under nitrogen was added 22 g. of stannous chloride ($SnCl_2 \cdot 2H_2O$) in 25 cc. of oxygen-free distilled water. On concentration to 25 cc. and cooling to about 5° C. a granular white precipitate weighing 17 g. appeared. The dried product melted at 163°–167° C.

*Analysis.*—Calculated for $Sn(NH_4)_2F_3Cl \cdot H_2O$: Sn, 44.80; N, 10.56; F, 21.50; Cl, 13.40; $H_2O$, 6.78. Found: Sn, 44.80, 44.48; N, 11.36; F, 21.51; Cl, 13.50; $H_2O$, 3.88–4.30.

*Example 2*

A solution of 48% $H_2F_2$ was neutralized by 2-aminoheptane. 10 cc. of the resulting solution was added to a filtered solution of 3.5 g. of stannous chloride dihydrate in 5 cc. of water. A flaky white precipitate weighing 7 g. was formed after cooling the solution to about 5° C. The precipitate was filtered, washed and dried and melted at 92–4° C.

*Analysis.*—Calculated for $Sn(C_7H_{18}N)F_2Cl \cdot 3H_2O$: C, 22.55; N, 3.75. Found: C, 22.17; N, 2.82.

*Example 3*

5 cc. of a solution of 48% $H_2F_2$ was neutralized by benzyl amine and the resulting solution was added to a filtered solution of 12 g. of stannous chloride dihydrate in 10 cc. of water. On cooling to about 5° C., 5 g. of flaky white crystals precipitated. These crystals were filtered, washed and dried, and melted at 112–3° C. The empirical formula for this compound is deemed to be $$Sn(C_7H_{10}N)F_2Cl \cdot 3H_2O$$

I claim:

1. The new compound having the empirical formula $Sn(NH_4)_2F_3Cl \cdot H_2O$.

2. The new compound having the empirical formula $Sn([n\text{-}C_5H_{11}][CH_3]CHNH_3)F_2Cl \cdot 3H_2O$.

3. The new compound having the empirical formula $Sn(C_6H_5CH_2NH_3)F_2Cl \cdot 3H_2O$.

4. The new compound having the empirical formula $Sn(NH_4)_2F_3Br \cdot H_2O$.

5. A stannous fluoro complex salt represented by the empirical formula $$Sn(RNH_3)_mF_nX \cdot pH_2O$$

where R is a member selected from the group consisting of H, lower alkyl, aralkyl and phenyl groups, where X is selected from the group consisting of Cl and Br, where $m$ is 2, $n$ is 3 and $p$ is 1 when R represents H and where $m$ is 1, $n$ is 2 and $p$ is 3 when R is other than H.

References Cited in the file of this patent

Mellor: Comprehensive Treatise on Inorganic and Theoretical Chemistry, Longmans, Green and Co., New York, N. Y., vol. 7, 1924. pages 422, 432 and 445.

Gmelin-Kraut: Handbuch der anorganischen Chemie, 4.1, Herdeberg 1911, page 330.